(12) United States Patent
Soler et al.

(10) Patent No.: US 7,239,402 B2
(45) Date of Patent: Jul. 3, 2007

(54) SPOT COLOR APPLICATION IN PRINTER DEVICE

(75) Inventors: Pau Soler, Barcelona (ES); Ferran Vilanova, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 10/194,957

(22) Filed: Jul. 11, 2002

(65) Prior Publication Data

US 2003/0030828 A1    Feb. 13, 2003

(30) Foreign Application Priority Data

Jul. 13, 2001    (EP)    ................................. 01306082

(51) Int. Cl.
  G06F 15/00  (2006.01)
  G06K 1/00  (2006.01)
(52) U.S. Cl. ...................... 358/1.13; 358/1.9; 358/1.15
(58) Field of Classification Search ................ 358/1.9, 358/504, 518, 1.15, 1.13; 347/43; 382/162, 382/165
See application file for complete search history.

(56) References Cited

U.S. PATENT DOCUMENTS

| | | | |
|---|---|---|---|
| 4,979,031 A | 12/1990 | Tsuboi et al. ................. 358/75 |
| 5,809,366 A | 9/1998 | Yamakawa et al. ........... 399/39 |
| 5,973,801 A | 10/1999 | Bresler ........................ 358/520 |
| 5,987,166 A | 11/1999 | Hayashi et al. ............. 382/163 |
| 6,008,907 A | 12/1999 | Vigneau et al. .............. 358/1.9 |
| 6,266,152 B1* | 7/2001 | Nakajima ..................... 358/1.9 |
| 6,456,395 B1* | 9/2002 | Ringness ..................... 358/1.9 |
| 6,480,299 B1* | 11/2002 | Drakopoulos et al. ....... 358/1.9 |
| 6,829,058 B1* | 12/2004 | Kumada .................... 358/1.15 |
| 6,833,937 B1* | 12/2004 | Cholewo .................... 358/518 |
| 6,851,794 B2* | 2/2005 | Yamamoto .................... 347/43 |
| 6,924,908 B1* | 8/2005 | Kimia ......................... 358/1.9 |
| 7,009,733 B2* | 3/2006 | Gruzdev et al. .............. 358/1.9 |
| 7,031,022 B1* | 4/2006 | Komori et al. .............. 358/1.9 |

FOREIGN PATENT DOCUMENTS

EP    0 854 638 A2    7/1998

* cited by examiner

*Primary Examiner*—David Moore
*Assistant Examiner*—Satwant Singh

(57) ABSTRACT

To translate a physical color to a color space of a printer device, a color patch is scanned using a printer's internal scanner. The printer then automatically prints that scanned color, together with a range of variations of that color, on the print media on which printing is to occur. A user may quickly and easily select a color match from the range of colors printed, by visual inspection. The user enters the selected color into the printer, using for example a number or position code, or by marking the selected color on the print media, which is then re-scanned by the printer. Thus, an iterative prior art manual procedure of color modification using color data determined by spectrophotometers is avoided.

17 Claims, 10 Drawing Sheets

Actual spot color

SPOT COLOR APPLICATION IN PRINTER DEVICE

FIELD OF THE INVENTION

The present invention relates to the field of printer devices, and particularly, although not exclusively to a method and apparatus for matching a user desired color onto a print medium.

BACKGROUND TO THE INVENTION

In the printing of images on a print media using a printer device, it is a common problem for a user of a printer device to emulate a color from a physical color patch supplied by a customer for print articles. For example, in the textile industry, textile designers may give samples to a human printer, operating a printer device, for the human printer to specify the colors for printing on a print material by a printer device. Finding an exact match of a physical color in a device color space is a non trivial exercise and has the following problems:

Firstly, prior art solutions for color sensing require either a calorimeter or a spectrophotometer. Typically, these are stand alone devices which need to be connected to a printer. A color patch is placed in the calorimeter or spectrophotometer to measure the color, which is fed into the printer as a color specification in digital data. However, since the calorimeters or spectrophotometers are not integrated into a printer device and need to be connected, this makes the work flow more complex, and additionally they are expensive, in the range $250.00 to $10,000.00. However, depending upon the model and type of calorimeter or spectrophotometer used, these can be more accurate than in a built in color sensor provided with a printer device.

Secondly, prior art automatic color matching systems may not fulfill the color matching expectation of an expert or a demanding designer. Small variations in shade may be very significant for some applications, particularly with spot colors. To obtain an acceptable color match solution, customers may be led into a time consuming and print media consuming iterative trial and error process for matching a color printed onto a print media with a sample color on a physical patch.

One object of specific implementations according to the present invention is to reduce the time and print media usage in matching a color printed on a print media by a printer device, with an expected color, for example on a color patch.

Another object of specific implementations according to the present invention is to achieve accurate color matching, without a requirement for a color sensing apparatus such as a calorimeter or spectrophotometer.

SUMMARY OF THE INVENTION

Specific implementations according to the present invention aim to utilize a built in color sensor on a printer device to sense a color from a physical color patch or other color sample. A printer device provided with a scanner device is provided with functionality to select a range of colors close to the scanned in color and to print a set of color spots including the scanned in color and a plurality of color spots having colors close to the scanned in color on a print media. Preferably the print media is a print media specified by a customer or user, and to which a color is to be printed on to match the color patch.

A user selects a color from a set of colors by visual inspection, and either enters a co-ordinate data into the printer device, identifying a position of the color within the set, or alternatively marks the color on the print medium which is then re-scanned by the scanner device of the printer, and an algorithm determines which color has been selected. The selected color is stored in a color book data within the printer device.

According to a first aspect of the present invention there is provided a method of matching a printed color to a color sample, said method characterized by comprising the steps of:

generating a color characterization data from said color sample;

generating a plurality of variation color data corresponding to a plurality of variations of said color sample;

printing on a print medium said plurality of variations of said color;

selecting an individual color of said plurality of variations of said color;

inputting a data describing a selected said individual color.

According to a second aspect of the present invention there is provided a printer device capable of matching a printed color with a color sample, said printer device comprising:

an interface capable of inputting color characterization data describing a color of said color sample;

a printer mechanism for printing color ink onto a print medium;

a color generation component for generating a plurality of variation colors placed at positions in color space, around a position of a color specified by an input color characterization data; and a color book memory for storing data describing a selected said color.

The invention includes a method of matching a printed color to a color sample, said method characterized by comprising the steps of:

generating a color characterization data from said color sample, by offering a color sample to scanner device, and generating said color characterization data in said scanner device;

generating a plurality of variation color data corresponding to a plurality of variations of said color sample, by printing a plurality of colors in a two dimensional array on a print medium, said plurality of colors corresponding to a plurality of color coordinates around said color characterization signal;

printing on a print medium said plurality of variations of said color sample;

selecting an individual color of said plurality of variations of said color sample; and inputting a data describing a selected said individual variation color, by scanning an array of printed color spots, each said color spot corresponding to color variation in color space around said color characterization data, to obtain a scanned color spot data; and storing said selected individual color as a color book data.

The invention includes a printer device capable of matching a printed color with a color sample, said printer device comprising:

an interface capable of inputting color characterization data describing a color of said color sample;

a color generation component for generating a plurality of variation colors placed in positions in color space around a position of a color specified by said input color characterization data;

a scanner device for scanning at least one color from said color sample, and generate a color sample characterization data corresponding to said color of said color sample;

a color book memory for storing data describing a said color; and a printer mechanism operable to print a plurality of color spots corresponding to said plurality of generated variation color in a two dimensional format on said print medium; and a scanning algorithm operable to scan a two dimensional array of color spots printed onto a print media by said printer device and to recognise an individual said color spot selected by a user.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
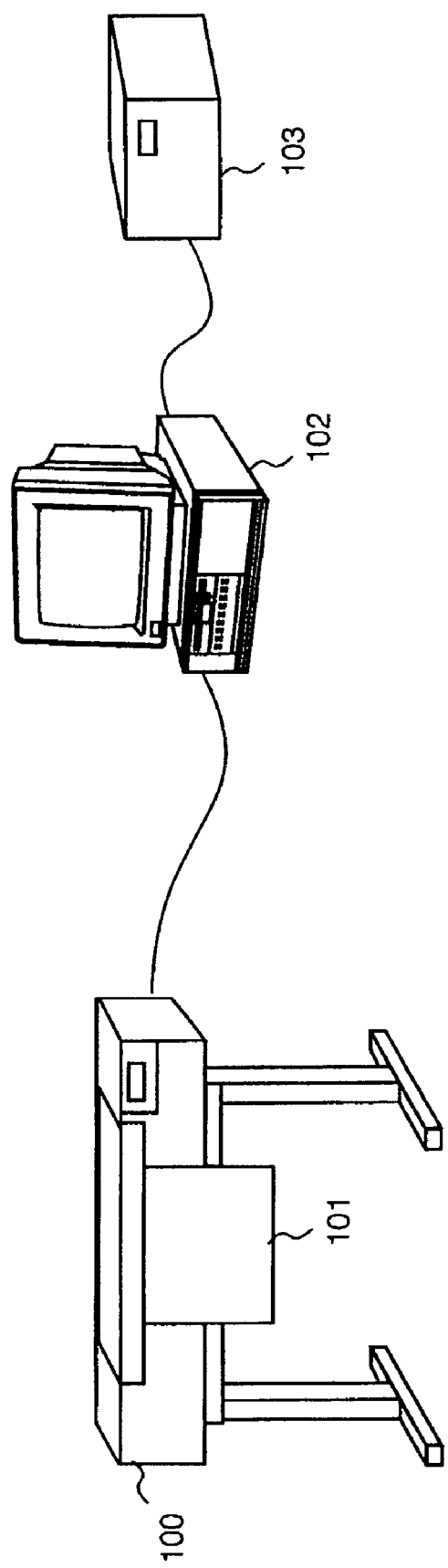
FIG. 1 illustrates schematically a printer device capable of performing a spot color matching, according to a specific method of the present invention.

Referring to FIG. 1 herein, there is illustrated schematically apparatus according to a specific embodiment of the present invention, comprising a printer device 100 for printing a poster or other print material 101 with color inks; a computer, for example a personal computer 102 communicating with the printer device 100; and optionally, a color sensing device such as a calorimeter, or spectrophotometer 103 may be provided.

Figure 2:
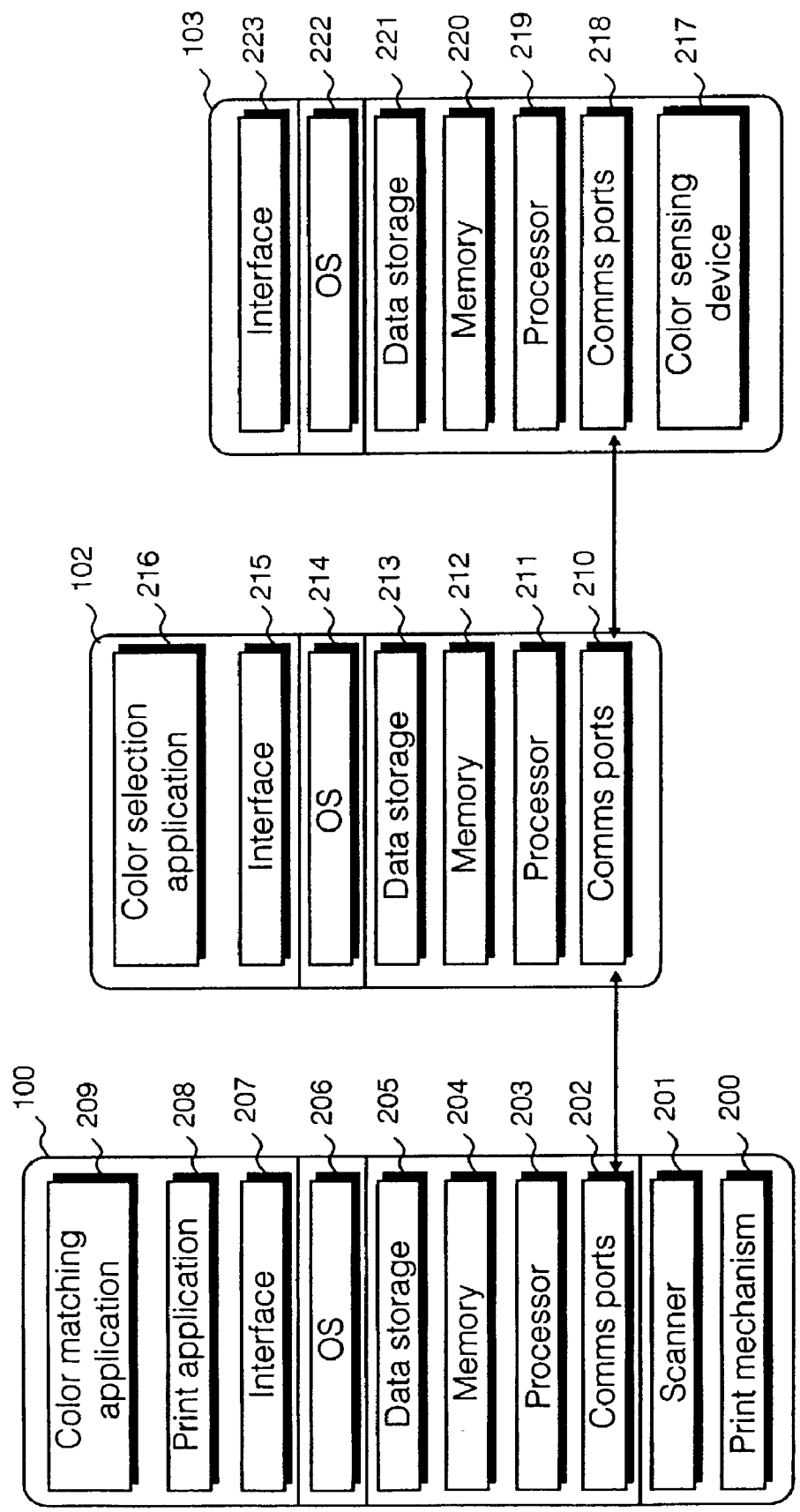
FIG. 2 illustrates schematically individual components of the printing system of FIG. 1.

Referring to FIG. 2 herein, there is illustrated schematically components of the apparatus of FIG. 1. Printer 100 comprises a printer mechanism 200 for printing color inks onto a print medium; a scanner device 201 for scanning a color sample, e.g. a color patch, to produce a color signal representing a shade of color of the color sample; a communications port 202 for communicating with other computer entities; a data processor 203; a volatile memory device 204; a data storage device 205, for example a hard disk drive; an operating system 206; an interface 207 for enabling an operator to input instructions to the printer device, and obtain a visual display of operations carried out by the printer device, a print application 208 for managing print of images by the printer mechanism 200; and a color matching application 209 for receiving color data from said color scanner 201 and/or an external source and/or interface 207, and generating a range of color signals for printing a corresponding respective range of colors via the printer mechanism 200 on a print medium.

Computer entity 102 comprises a communications port 210 for communicating with the printer device; a data processor 211; a non volatile memory device 212; a data storage device 213, for example a hard disk data storage device; an operating system 214; an interface 215 comprising a visual display monitor, keyboard and printing device; and a color selection application 215.

The color sensing device, for example a calorimeter or spectrophotometer may comprise a color sensor 217 for sensing a color of a color patch or other sample having color; a communications port 218 for communicating with other entities; a data processor 219; a volatile memory device 220; a data storage device 221, for example a hard disk drive or similar; an operating system 222; and an interface 223 for enabling a user to enter instructions for operating the color sensing device, and receiving visually displayed information concerning the operation of the color sensing device.

Whilst FIGS. 1 and 2 illustrate a specific embodiment according to the present invention, variations on implementation can be made without departing from the scope of the invention. For example, the interface 207 on the printer device may comprise a web administration interface accessible via the communications port of that printer device, over a communications network, and be readable by a web browser resident on computer entity 102, via which an operator may use to remotely instruct and monitor the printer device. Further, the color matching application 209 may be resident on the printer device itself, or resident on a separate computer entity 102. The functionality of the color matching application to select a range of colors may be independent of its physical location, or a physical platform on which the application is installed. However, in the best mode herein the color matching application 209 is resident on the printer device.

Further, color sensing device 103 may be utilized to provide an output of sensed color data, which may be input into the printer device, via the communications port 202, an interface 207 of the printer device, either directly or via an intermediate computer entity, for example the computer entity 102 as an alternative to scanning in a color sample using the scanner 201 on the printer device. The color sensing device 103 is an optional feature, and may provide a higher accuracy color match to a color patch or color sample, than a scanner device 201 of the printer device. However, in its broadest scope of the invention, the color sensing device 103 in the form of a calorimeter or spectrophotometer, is not essential, and in the best mode implementation is not present.

Figure 3:
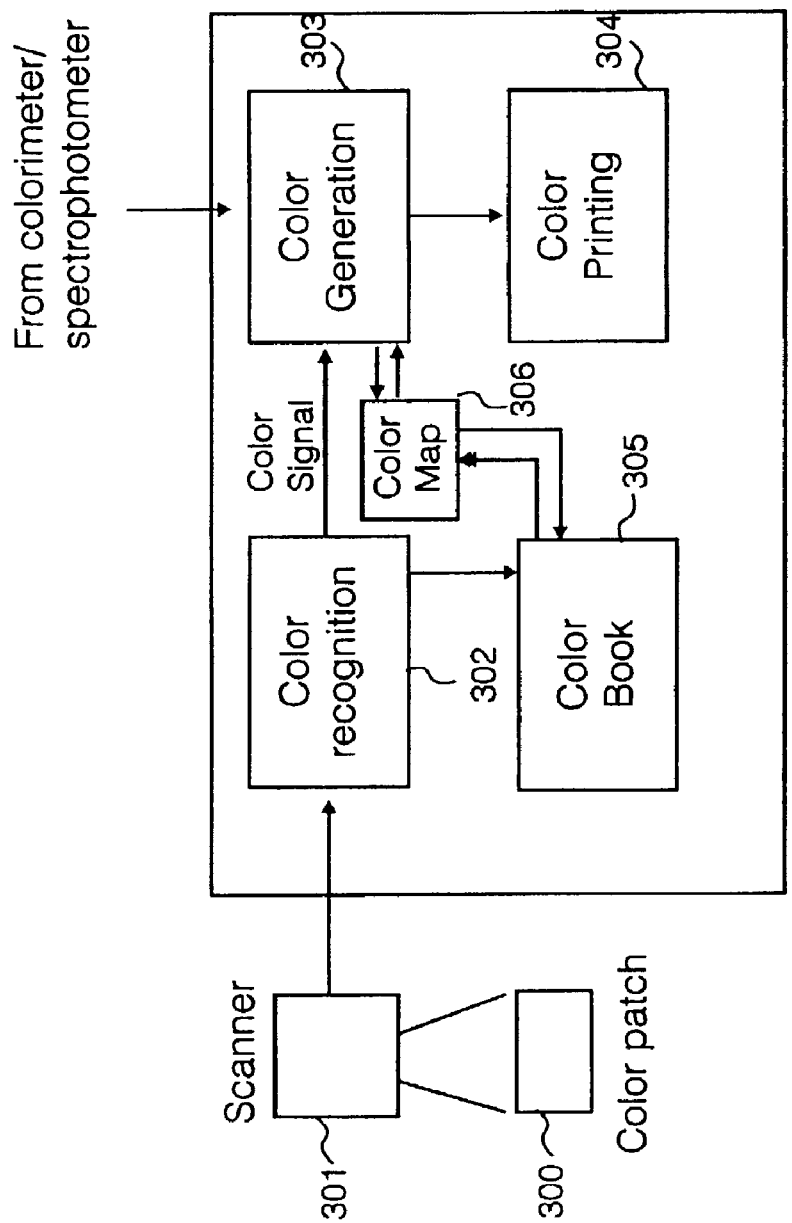
FIG. 3 illustrates schematically components of the printing device of FIG. 1.

Referring to FIG. 3 herein, there is illustrated schematically logical components of the printing system shown in FIG. 1 in general overview, illustrating main process steps for carrying out a specific method according to the present invention. A color patch 300 is offered up to a scanner device 301 of the printer device. The scanner device scans the color patch, and color recognition algorithms within the scanner device output a color characterization signal. The scanner and color recognition algorithms 302 automatically measure the color, and a degree of accuracy of measurement is limited by the number of channels of the scanner.

Once the color is characterized, for example CIEL*a*b*, data is obtained, this information goes through a color map 306 to obtain device color co-ordinates along with a set of variations of those color co-ordinates. The variations of color co-ordinates are done in CIEL*a*b*, in three dimensions (3D). The variations can also be done in device color space, but this may be non trivial. A textile printer generally has between 7 and 12 colors, so sampling across this device color space is quite inefficient. Even to sample across a Cyan Magenta, Yellow, K (CMYK) four dimensional (4D) is quite complex if it is to be clear to a user. If three or less main colors are identified, e.g. Cyan Magenta Yellow, sampling is feasible. These may be specified by a user.

Variation increments and directions may be decided either by a user or automatically.

After color generation 303, the variations are printed on the desired print media. The user must load the desired print media into the printer device, if it is not already loaded, so that the color variations can be printed directly onto the print media.

Following printing of the spots onto the print media, a user must make a selection of color. The user can either select a color by determining an X, Y position in the array and entering this into the user interface on a printer device, or by simply marking the selected color spot with a different color ink.

Figure 4:
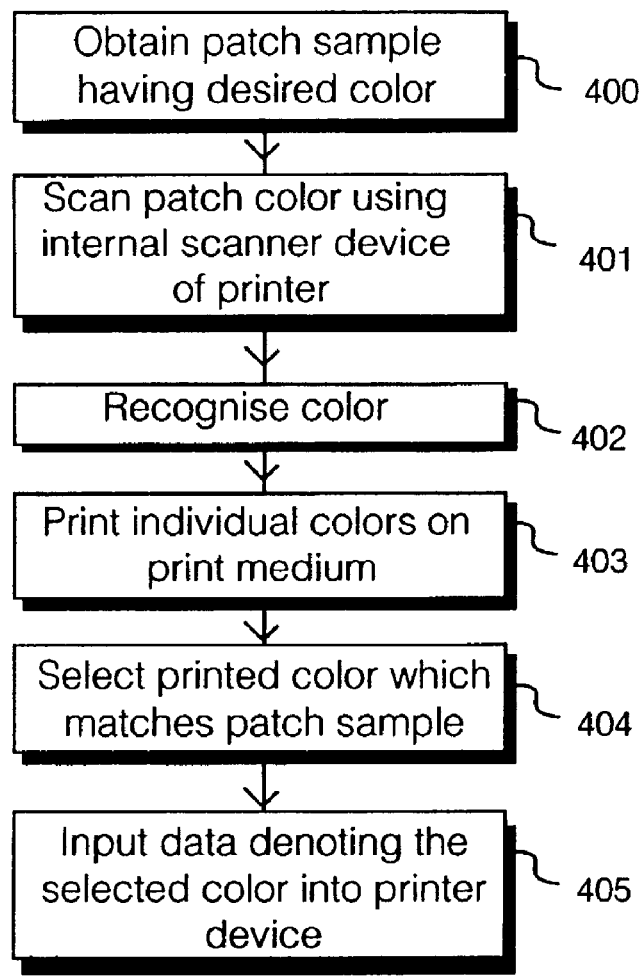
FIG. 4 illustrates schematically a generalized method of operation of the printing system of FIG. 1.

Referring to FIG. 4 herein, in step 400, the user obtains a patch sample having the desired color and in step 401 scans the patch color using, in the best mode implementation, an internal scanner device of a printer. The scanner device recognizes the patch color in step 402, and prints an array of color spots onto a print medium in step 403. In step 404, the user selects a printed color from the array of spot colors, and enters data describing the selected color into the printer device in step 405.

Figure 5:
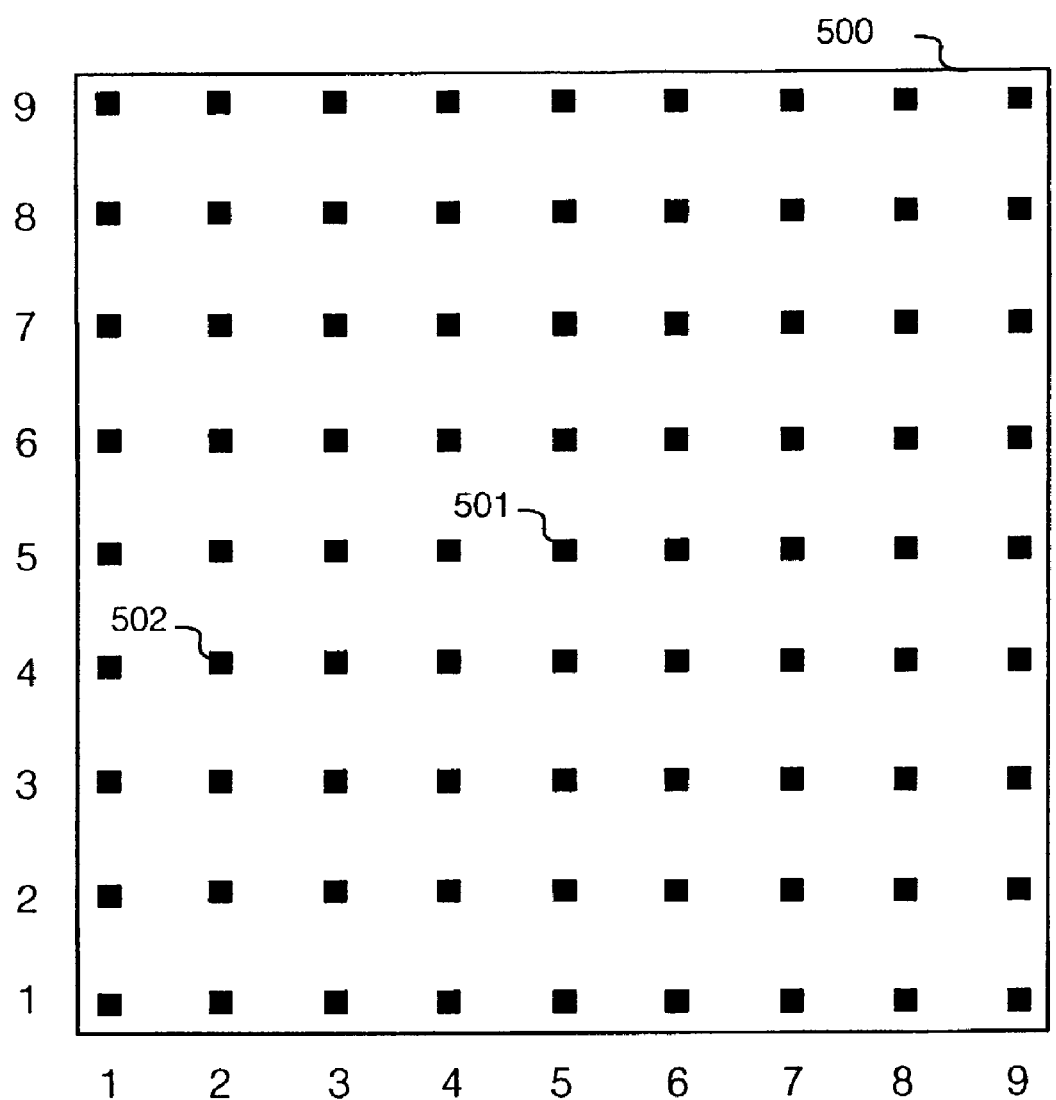
FIG. 5 illustrates schematically an array of color spots printed by a printer device on a print media according to a specific method of the present invention.
Figure 5:
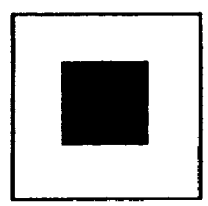

Referring to FIG. 5 herein, there is illustrated schematically a 9×9 array of spot colors printed into a print medium 500. Within the array, one of the spots is of a color corresponding to the color characterization signal input into the printer device as measured by the scanner device (or alternatively from the colorimeter/spectrophotometer). A range of colors are generated having locations in color space around the specified color of the color characterization signal. Each color spot is of a slightly different color to the target color 501 generated from the color characterization signal. Additionally, each color shade within the array can be identified by its location within the array by an X and Y co-ordinate information. This is readily visible to the human user since an X, Y co-ordinate numbering system may be printed with the array. For example, the human user may select a color shade at position (2,4).

Figure 6:
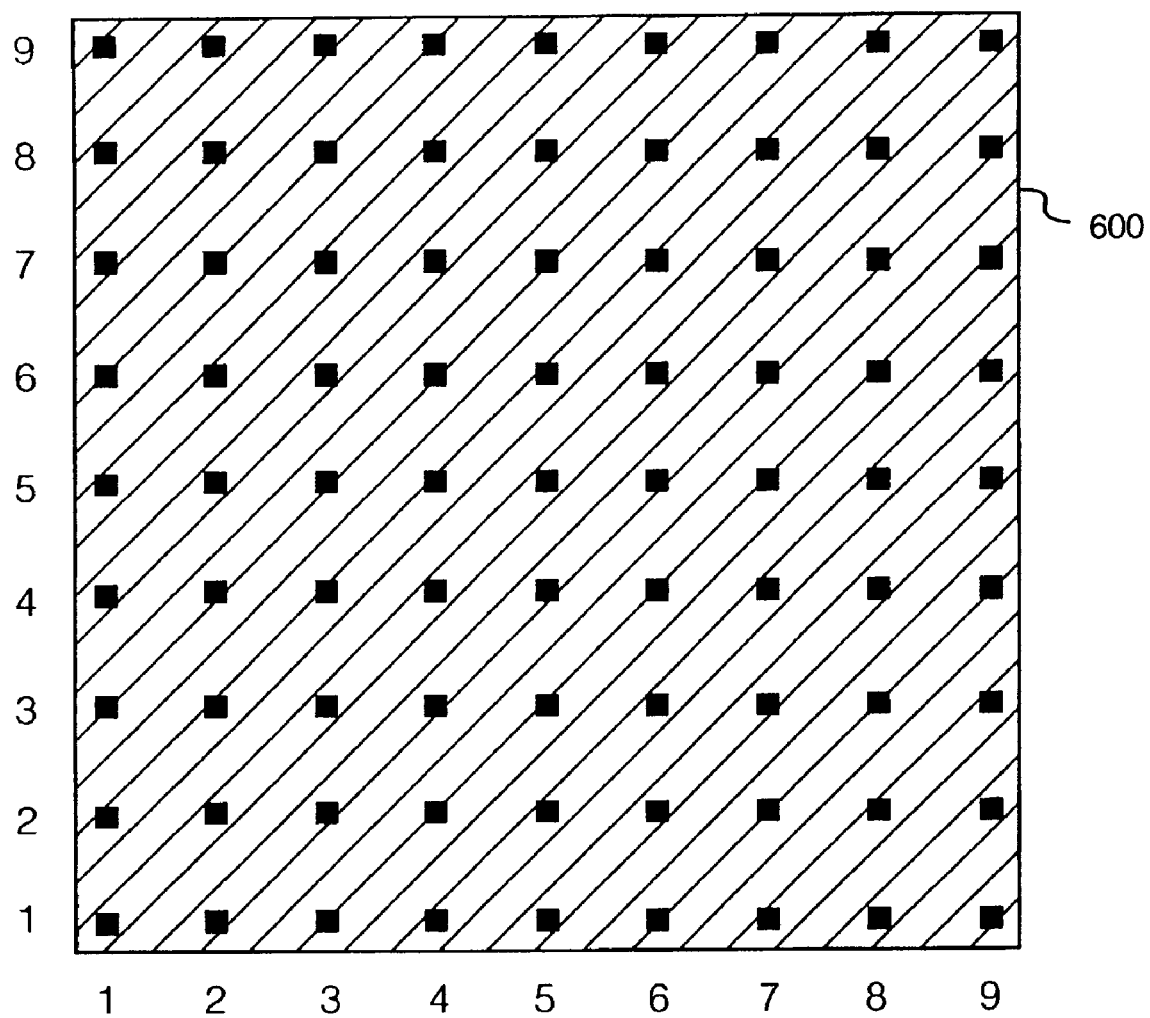
FIG. 6 illustrates schematically an array of color spots printed by a printer device on a print media according to a specific method of the present invention, having a colored background.
Figure 6:
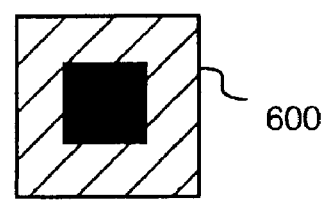

Referring to FIG. 6 herein, there is illustrated schematically a second array of color spots. The second array of color spots is identical to the first array of color spots, except a background coloration 600 is applied to the printer medium, allowing a user to make a visual judgement of the selected color, against a different background color from a base color of the print medium. The color of the background coloration 600 may be obtained by the same means as the targeted color spot, that is to say the background coloration may be scanned in as a color patch, or may be input by a user as a color characterization signal, from a calorimeter or spectrophotometer.

Figure 7:
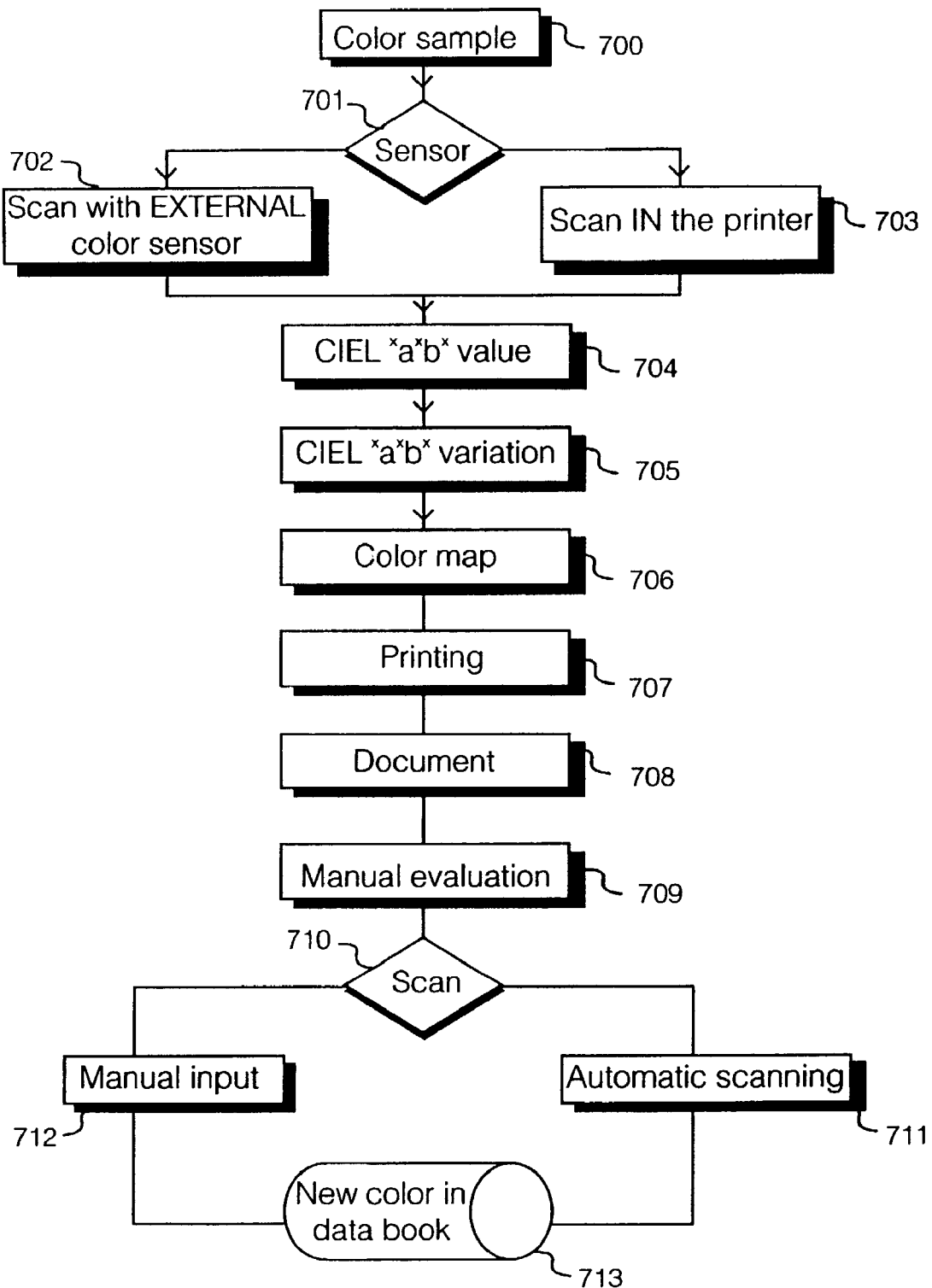
FIG. 7 illustrates schematically process steps carried out by the printer device for scanning and selecting a color to match a color patch or sample.

Referring to FIG. 7 herein, there is illustrated schematically process steps carried out by the printer device for scanning and selecting a color. Automatic steps are carried out by means of an algorithm stored as computer program instructions in a data storage device of the printer device. The instructions cause the data processor to operate the steps for controlling of the printer device for printing an array of colors, and for receiving input information via an interface or via the scanner for identifying a color of a printed array of colors, selected by a user. In step 700, the color sample is scanned into the scanner by sensors 701. The sensors 701 can be part of the scanner device in the printer itself, or alternatively, an external colorimeter or spectrophotometer. In the case of an external colorimeter or spectrophotometer, in step 702 the color sample is scanned with the external color sensor. In the case of the internal scanner of the printer, scanning is carried out in step 703. The result of the scanning operation is a color characterization signal, comprising a CIEL*a*b* value 704. In step 705, a set of CIEL*a*b* variations are generated for colors surrounding the input color in color space. In step 706, the color map converts a CIEL*a*b* color co-ordinate to a device color space, for example CMYK. The color represented by the color characterization signal is mapped from its initial color space to a color space of the printer device. Variations of the color in the initial color space (CIEL*a*b*) are computed in step 705, followed by mapping of each of those color variations to the device color space prior to printing. The device color space specifies which inks will be used for printing the finalised printed colors. In step 707, the printer device prints a 2 dimensional array of color spots, where each color spot corresponds to an individual color variation generated in step 705, taking as its source data, data in the color map 706. This results in a printed document 708 on a print medium, showing an array of color spots, each having slightly different color, and centered around a target color, corresponding to the color characterization signal output from the external color sensor or printer scanner. In step 709 a human user manually evaluates the color spots visually, and selects a color spot. The human user can then input details of the selected color spot in two ways. Firstly, the human user can visually read a two dimensional array position of the selected color spot and enter an X, Y co-ordinate value identifying that position within the array into a user interface of the printer device, or associated computer 102. Alternatively, the human user can simply mark the selected spot on the print medium with a different color ink, and the printer device may then automatically roll back the print medium under the scanner, scanning the array of color spots, to find a color spot which has been marked by the user in step 711. During the automatic position identification scanning, the printer device identifies, by an algorithm, which color spot has been selected from the array, and by identifying the two dimensional position in the array, can look up from a look up table, a corresponding color in the color map 706 which has been selected. In step 713, the selection of the new color is stored in the printer device as a new color data.

Figure 8:
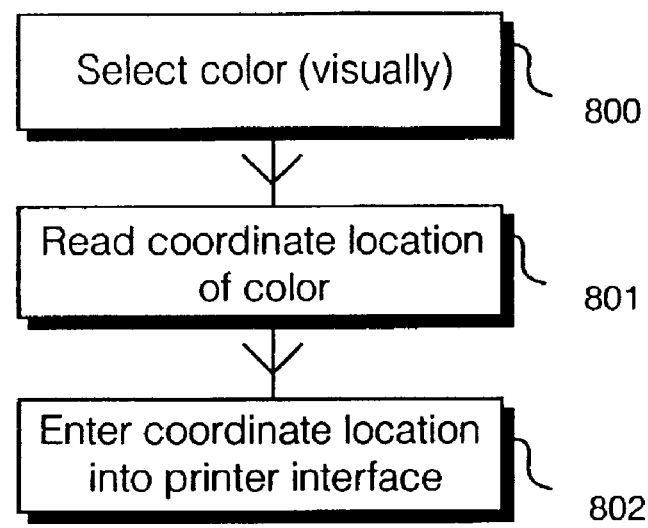
FIG. 8 illustrates schematically a manual selection process for selecting and entering data describing a selected color spot.

Referring to FIG. 8 herein, there is illustrated schematically process steps carried out for manual selection of a color spot from a printed array of color spots. In step 800, having viewed an array of color spots, a human user visually selects a color spot. In step 801, the human user reads the co-ordinates of the selected color spot, for example (2,4) and in step 802 enters those co-ordinates as X, Y co-ordinate into the printer device via the printer interface. The printer interface can be for example a keypad having digits 0–9 and an "enter" button, or can be a visual display presented on a browser of a PC 102, which browses a web display generated by the interface 207 of the printer device.

Figure 9:
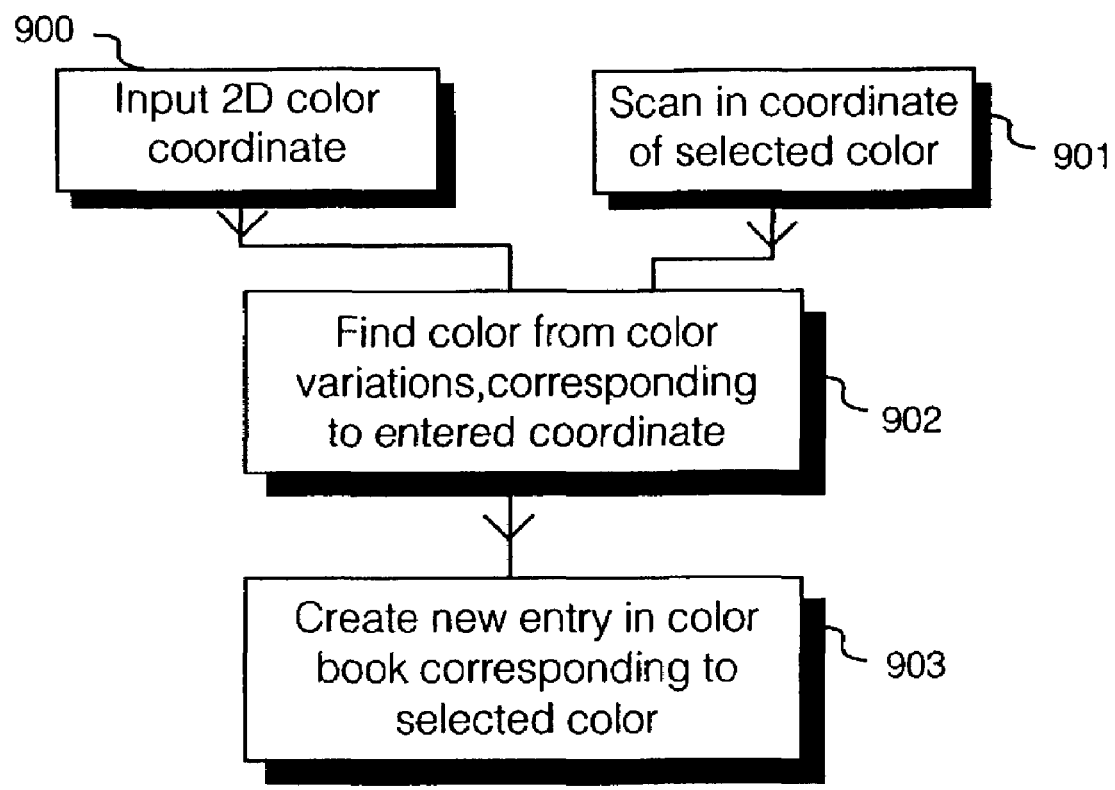
FIG. 9 illustrates schematically a process for creating a color book entry for a selected color spot.

Referring to FIG. 9 herein, there is illustrated schematically process steps carried out by the printer device for creating a new entry in a color book corresponding to a selected color. In step 900 the user inputs manually the two dimensional co-ordinates of a selected color in the two dimensional array which has been printed on the print medium. Alternatively, in step 901, the scanner device scans in the co-ordinate of the selected color, and applies an algorithm to determine the two dimensional co-ordinates of the selected color as hereinbefore described. In step 902, the printer device identifies the color at the selected two dimensional co-ordinate on the array from a three dimensional color map stored in the printer device's memory in step 706. The color selected in the color map corresponds to the two dimensional X, Y co-ordinate on the array of the color spot selected by the user. In step 903, the printer device creates a new entry in a color book database, where the new entry corresponds to the selected color.

Specific implementations according to the present invention may have an advantage of allowing sampling of a color patch by a printer device's own internal scanner, without the need for a colorimeter or spectrophotometer. This is both more convenient and less costly than using a colorimeter or spectrophotometer. Since an accurately matched color sampled from a color sample by the scanner or by a colorimeter/spectrophotometer may give a slightly different visual effect when printed on a print medium than expected, an opportunity is given for a human user to select a variation of the color from an automatically generated array of spot color variations having colors generated around the sampled color in color space. The user may select a particular color spot by marking that color spot or by noting the array position, and in the former case, the scanner device may automatically scan in and identify that selected color spot variation, and then store that information in an internal color block data stored on a printer device.

Figure 10:
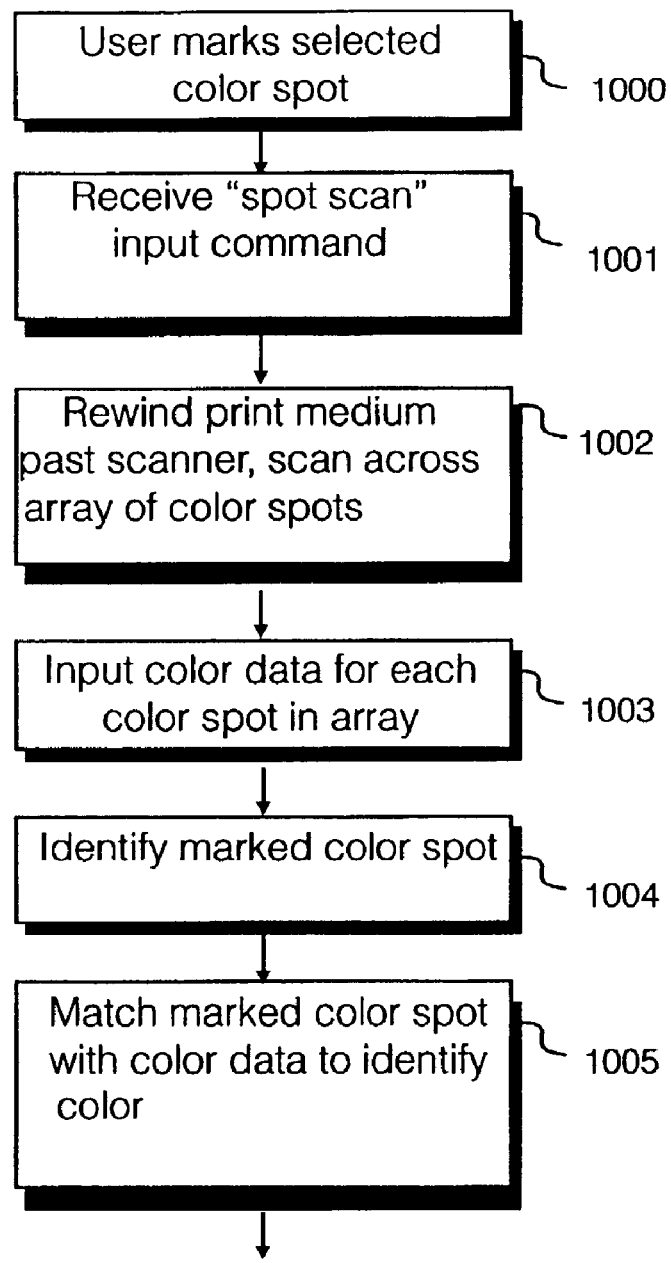
FIG. 10 illustrates schematically a process for automatic selection of a color spot selected by a user.

Referring to FIG. 10 herein, there is illustrated schematically process steps carried out by the printer device 100 for automatically identifying a color spot marked by a human user. The color spot is marked by the human user in step 1000 by the user applying a pen and circling, crossing or otherwise marking a selected color spot. In step 1001 the user activates the printer device to re-scan the color spot array containing the selected marked color spot, by inputting a "spot scan" command on an interface of the printer device. In step 1002, in response to the input "spot scan" command, the printer device rewinds the print medium past the scanner head and the scanner head traverses across the array of color spots. In step 1003, color data for each of the color spots in the array are input into the printer device, along with a set of relative two dimensional X, Y co-ordinate positions of those color spots. In step 1004, the printer device identifies which particular color spot has been marked. This can occur for example by the printer device identifying a different color ink adjacent to one color spot, which does not fall within a set of colors initially printed for the color spots. Since the X, Y position of this outstanding color is known, this identifies the X, Y position of the color spot selected by the user. In step 1005, having identified the selected color spot, the selected color spot is matched with the originally printed array of color spots, to make sure that the correct color spot has been identified, and following that check, the selected color can be input into the internal color book data, as described previously.

The invention claimed is:

1. A method of matching a printed color to a color sample at a printer device, said printer device comprising a color scanner device, said method comprising:
    offering a color sample to said color scanner device;
    generating a color characterization data from said color sample;
    generating a plurality of variation color data corresponding to a plurality of variations of said color sample;
    printing on a print medium said plurality of variations of said color;
    selecting an individual color of said plurality of variations of said color; and
    inputting a data describing said selected individual color by scanning said selected individual color with said color scanner device.

2. The method as claimed in claim 1 further comprising:
    storing information describing said selected individual color as a color book data.

3. The method as claimed in claim 1, wherein said generating a color characterization data from said color sample comprises:
    said scanner device generating said color characterization data.

4. The method as claimed in claim 1, wherein said generating a plurality of variation color data comprises:
    generating a plurality of variation colors corresponding to colors at coordinates in color space around said color characterization data.

5. The method as claimed in claim 1, wherein said printing said plurality of variations of said color comprises:
    printing a plurality of colors in a two dimensional array on a print medium, said plurality of colors corresponding to a plurality of color co-ordinates around said color characterization data in color space.

6. The method as claimed in claim 1, wherein said selecting an individual color comprises:
    marking a selected color by means of applying a different color ink on or near said color; and
    inspection of said plurality of color variations of said color printed on said print medium.

7. The method as claimed in claim 1, wherein said inputting a data describing a selected individual color comprises:
    determining a data identifying a selected color corresponding to one of said plurality of variations of said color printed on said print medium; and
    inputting said data identifying said selected color into a printer device.

8. The method as claimed in claim 1, wherein said inputting a data describing a selected individual color further comprises:
    identifying with said color scanner device a selected color as being a color physically marked to distinguish it from other said colors of said array.

9. The method as claimed in claim 1, wherein said inputting a data describing a selected individual color comprises:
   determining with said color scanner device a data identifying a selected color corresponding to one of said plurality of variations of said color printed on said print medium;
   inputting said data identifying said selected color spot into said printer device from said color scanner device; and
   matching said identification data with a color characterization data of said selected color.

10. A printer device capable of matching a printed color with a color sample, said printer device comprising:
   a color scanner device for scanning at least one color from said color sample and generating a color characterization data characterizing a color of said color sample, and further for scanning an array of color spots corresponding to a plurality of color variations occupying positions in color space around a color space location corresponding to said sample color;
   an interface capable of inputting a color characterization data describing a color of said color sample;
   a printer mechanism for printing color ink onto a print medium;
   a color generation component for generating the plurality of variation colors placed at positions in color space around a position of a color specified by an input color characterization data, the color scanner device further for scanning a selected one of said variation colors; and
   a color book memory for storing data describing said selected variation color.

11. The printer device as claimed in claim 10, comprising:
   a scanner device for scanning at least one color from said color sample, wherein said scanner device is configured to scan in a color of a color sample and generate a color sample characterization data.

12. The printer device as claimed in claim 10, comprising:
   an interface capable of receiving color characterization data from a color sensor device.

13. The printer device as claimed in claim 10, comprising a scanning algorithm, said scanning algorithm operating to:
   input scan data corresponding to a two dimensional array of color spots printed onto a print medium;
   recognize an individual said color spot selected by a user from said scan data; and
   store a color characterization data corresponding to said recognized selected color spot.

14. The printer device as claimed in claim 10, operable to:
   recognize a position of a said input color characterization data in three dimensional color space;
   generate a plurality of variation color data in said three dimensional color space, said variation color characterization data generated at positions in said three dimensional data space around said input color characterization data; and
   print a plurality of color spots, corresponding to said plurality of generated variation color characterization data, in a two dimensional format on a print medium.

15. The printer device as claimed in claim 10, operable to:
   recognize a position of a said input color characterization data in three dimensional color space;
   generate a plurality of variation color data in said three dimensional color space, said variation color characterization data generated at positions in said three dimensional data space around said input color characterization data;
   print a plurality of color spots, corresponding to said plurality of generated variation color characterization data, in a two dimensional format on a print medium; and
   print a plurality of identification data for identifying individual color spots within said printed two dimensional array on said print medium.

16. A method of matching a printed color to a color sample, said method comprising:
   generating a color characterization data from said color sample, by offering a color sample to scanner device, and generating said color characterization data in said scanner device;
   generating a plurality of variation color data corresponding to a plurality of variations of said color sample, by printing a plurality of colors in a two dimensional array on a print medium, said plurality of colors corresponding to a plurality of color coordinates around said color characterization signal;
   printing on a print medium said plurality of variations of said color sample;
   selecting an individual color of said plurality of variations of said color sample;
   inputting a data describing a selected said individual variation color, by scanning an array of printed color spots, each said color spot corresponding to color variation in color space around said color characterization data, to obtain a scanned color spot data; and
   storing said selected individual color as a color book data.

17. A printer device capable of matching a printed color with a color sample, said printer device comprising:
   an interface capable of inputting color characterization data describing a color of said color sample;
   a color generation component for generating a plurality of variation colors placed in positions in color space around a position of a color specified by said input color characterization data;
   a scanner device for scanning at least one color from said color sample, and generate a color sample characterization data corresponding to said color of said color sample;
   a color book memory for storing data describing a said color;
   a printer mechanism operable to print a plurality of color spots corresponding to said plurality of generated variation color in a two dimensional format on said print medium; and
   a scanning algorithm operable to scan a two dimensional array of color spots printed onto a print media by said printer device, to recognise an individual said color spot selected by a user, and to obtain a data describing said selected color spot.

* * * * *